(12) United States Patent
Jones

(10) Patent No.: US 11,945,668 B2
(45) Date of Patent: Apr. 2, 2024

(54) CARGO STRAP WINCH RAPID REWINDING TOOL

(71) Applicant: Stuart Adrian Jones, Bragg Creek (CA)

(72) Inventor: Stuart Adrian Jones, Bragg Creek (CA)

( * ) Notice: Subject to any disclaimer, the term of this patent is extended or adjusted under 35 U.S.C. 154(b) by 247 days.

(21) Appl. No.: 17/444,741

(22) Filed: Aug. 9, 2021

(65) Prior Publication Data
US 2022/0363503 A1 Nov. 17, 2022

(30) Foreign Application Priority Data

Apr. 28, 2021 (CA) .................. CA 3116495

(51) Int. Cl.
*B65H 18/10* (2006.01)
*B60P 7/08* (2006.01)
*B65H 75/44* (2006.01)

(52) U.S. Cl.
CPC ............ *B65H 18/10* (2013.01); *B60P 7/0853* (2013.01); *B65H 75/4494* (2013.01); *B65H 2403/735* (2013.01)

(58) Field of Classification Search
CPC .......... B65H 75/4494; B65H 2403/735; B65H 54/585; B60P 7/0853; B60P 7/083; B60P 7/0846; B60P 7/0838; B66D 1/14
See application file for complete search history.

(56) References Cited

U.S. PATENT DOCUMENTS

| | | | |
|---|---|---|---|
| 4,873,742 A * | 10/1989 | Dillon ................. | B60P 7/0853 74/551.9 |
| 6,729,604 B1 | 5/2004 | Claycomb | |
| 6,824,339 B1 | 11/2004 | Childers | |
| 9,642,504 B2 * | 5/2017 | Andersson ........... | B65H 75/185 |
| 10,000,148 B1 * | 6/2018 | Haynes ............... | B65H 75/4494 |
| 2011/0079967 A1 * | 4/2011 | Presley ................ | B66D 1/12 279/145 |
| 2016/0339830 A1 * | 11/2016 | McLemore .......... | B60P 7/0846 |
| 2019/0315263 A1 * | 10/2019 | Vande Sande ....... | B60P 7/083 |

FOREIGN PATENT DOCUMENTS

CA 2631857 A1 12/2008

OTHER PUBLICATIONS

Canadian Intellectual Property Office, Examiner's Requisition dated Dec. 10, 2021, issued in relation to corresponding Canadian patent application No. 3,116,495.

* cited by examiner

*Primary Examiner* — Michael R Mansen
*Assistant Examiner* — Nathaniel L Adams
(74) *Attorney, Agent, or Firm* — Spencer Fane, LLP

(57) ABSTRACT

This invention is for safely speeding up the rewinding of a strap used to secure cargo on a truck or trailer. The Tool consists of a shaft which in use extends into the inside of a conventional strap winch drum. At the end of the shaft is a cylindrical elastomeric plug which is a tight fit into the inside of the winding drum. The shaft is then connected to a rotary drive apparatus comprising a hand crank or is power driven.

Figure 1:
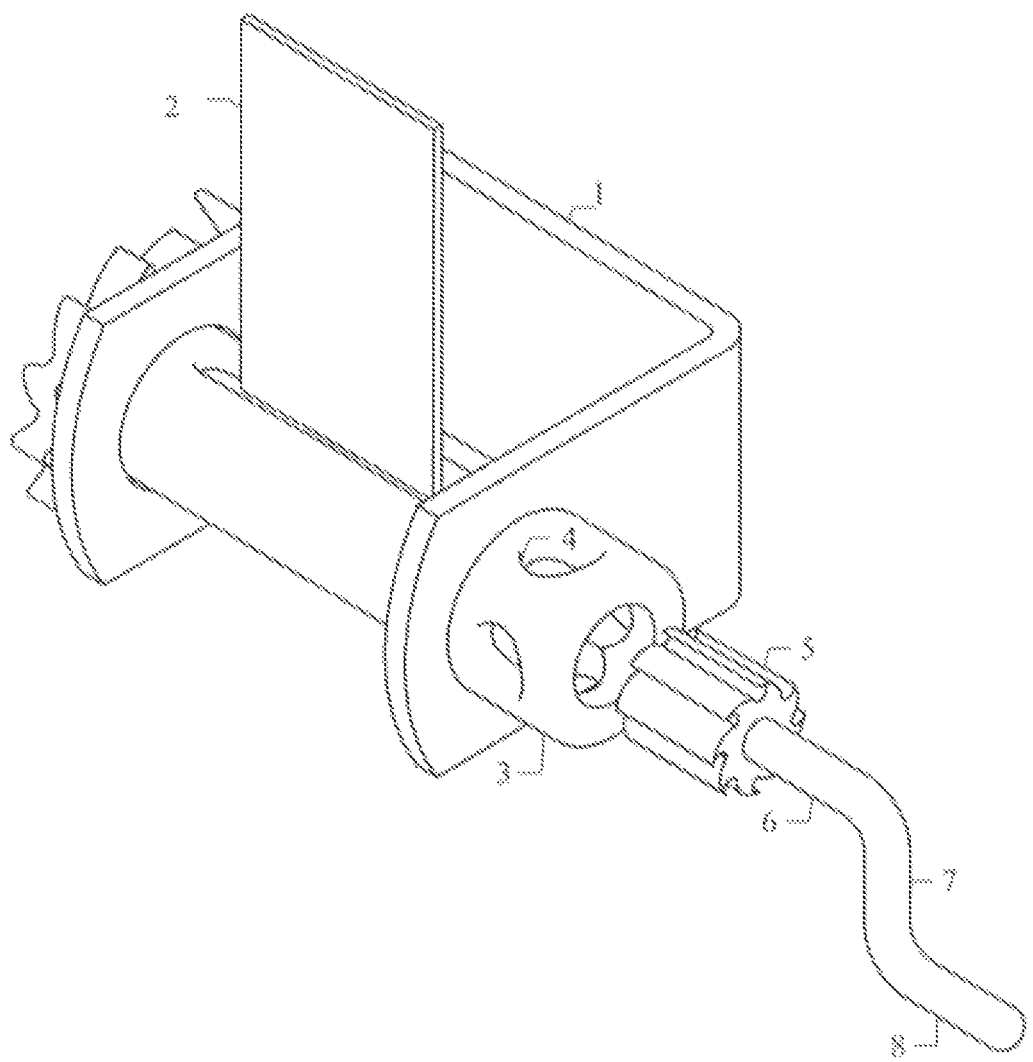

Because the tool can be simply pushed into the drum and operated without the requirement of alignment of the shaft, for a mechanical connection between the shaft and winch drum, the operator's hands need not be on the tool other than on the handle which is not above the drum. This is typically quicker and safer than the prior art.

11 Claims, 2 Drawing Sheets

CARGO STRAP WINCH RAPID REWINDING TOOL

BACKGROUND

Tie down straps are conventionally used for securing cargo onto flat beds of trucks and trailers. One end of a strap is typically connected to one side of the truck or trailer and the other end of the strap is connected to a cargo strap winch on the other side of the truck or trailer.

Cargo strap winches are common, so their components are not described in detail in this application. However, one component of the winch is identified i.e., the annular ring (3) which is next to the winch drum. It's an extension of the winch drum. The annular ring has circular apertures (4) around its periphery. It has no function in the invention, but it is typically key to the prior art. (See FIG. 1)

The strap is placed over the load and the winch is tightened to secure the load on the truck. Each belt winch typically includes a ratchet mechanism and a winding drum.

One end of the strap is placed through a slot on the winding drum which is rotated by typically using a winch bar. These winch bars typically fit into one of the apertures.

Once the cargo is secure and moved to the desired location, the strap is removed by releasing the ratchet mechanism. The cargo is removed, leaving the straps unwound from the winding drum. The user must then wind the straps back onto the winding drum either by manually rotating the annular portion of the drum or by inserting a winch bar back into an aperture and then rotating the drum. This process is typically time consuming and requires considerable effort to prevent the straps, which are typically nylon, from dragging on the pavement which can fray the straps. There are a variety of tightening bars on the market that are used to tighten winch straps over a load.

PRIOR ART

There are inventions for rewinding a strap, intended to improve on the operation of a using a winch bar into the winch drum apertures. The current Prior Art is expressed in three patents: Canadian patent number CA 263, 1857 and U.S. Pat. Nos. 6,824,339 and 6,729,604.

Canadian Patent CA 2631857: Inventor: Drinkhorn Joseph A, (USA), Filed 2008 May 21.

The winding drum is rotated with a bar with a projection of a right-angle rotatable link member attached to this bar which is projected into one aperture (4), at the end of the winch drum, to operate the tool. The bar is then rotated to wind the winch drum. The link member is able to rotate relative to the bar so that the link member can be threaded into the aperture and removed after use.

The link member has to be aligned and then moved into an aperture to connect the bar to transfer torsion to the winch. This is a twostep operation requiring concentration and good lighting. The connection of the tool to the winch drum requires the operator's hand to be near the drum which degrades the safety of the tool.

The tool requires assembly of machined components.

U.S. Pat. No. 6,824,339: Inventor: Childers; John Ray. (Tocoa. GA USA), Filed 2003 Jul. 22.

This patent is entitled "Belt winch speed handle". The tool consists of a handle, an arm and a drum. To avoid confusion in this explanation the tool drum is labelled as a shaft from hereon. To operate this tool the shaft is projected into the annular ring of the winch. The shaft end has a small key at right angles near the end of the shaft. The end of the shaft is cut at an angle of approximately 45 degrees which allows room for the shaft and the key to fit inside the annular ring with the tool lifted. When the shaft and key are in the required alignment inside the annular ring the tool is rotated so that the shaft is concentric with the winch drum and with the key fitting into an aperture. When the shaft is turned the key provides a torsional connection with the winch.

The procedure for connecting the tool with the winch (and disconnecting), requires accurate positioning and alignment. This requires concentration and good lighting. The tool requires assembly of machined components.

U.S. Pat. No. 6,729,604: Inventor: Claycomb; Kenneth, Mont Airy, MD US),

Date of patent 2004 May 4

A cylindrical spindle member is inserted into the hollow of a winch drum. The spindle has a locking detent member adapted for radial outward movement for engagement with an aperture in the winch drum once the spindle member is inserted fully rotation of the spindle member rotates the winch drum.

To disengage the tool the detent member is suppressed into the spindle allowing the spindle to be removed from the winch drum.

Operating the tool including alignment of the indent with an aperture and withdrawing the tool from the winch would take time and concentration.

The connection of the tool to the winch drum requires the operator's hand to be near the drum which degrades the safety of the tool.

The tool requires assembly of machined components.

SUMMARY

The invention is an attachable winding tool for the purpose of rewinding load straps on a truck or trailer after removing the straps required for securing loads during travel.

The required torsional connection of the tool to the winch is achieved via a cylindrical elastomeric plug pushed into the longitudinal hole in the winch drum. The elastomeric plug diameter is slightly larger than the hole in the winch drum diameter and the elastomeric plug has a saw tooth periphery. These characteristics ensure effective torsional connection between the winch and the tool. The tool can be used by hand or be powered by a rotary drive apparatus

DRAWINGS

FIG. 1. Shows the invention including a hand crank.

Figure 2:
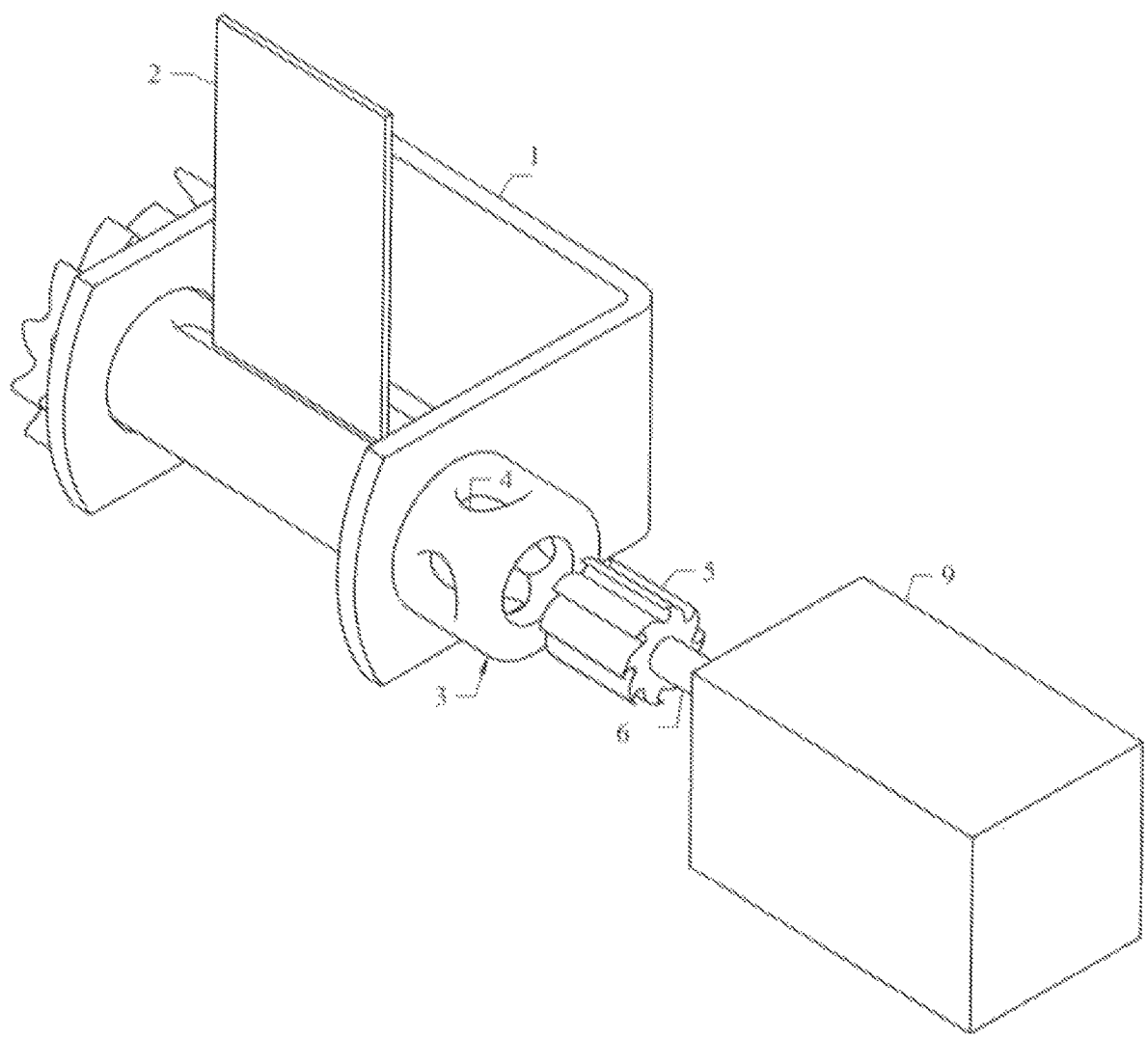

FIG. 2. Shows the invention including a rotary drive apparatus.

The components are numbered as follows:
1. Cargo winch.
2. Nylon winch strap
3. Annular ring.
4. Apertures.
5. Elastomer plug.
6. Shaft.
7. Arm.
8. Handle.
9. Rotary drive apparatus.

DETAIL DESCRIPTION

The present invention is a tool that provides convenient rewinding of a strap onto a winch, (1) and more particularly, a tool that provides rapid rewinding onto a winch of a load strap (2) of the type used to secure cargo on a flatbed of a truck or trailer.

The present invention does not require a metal-to-metal connection between a shaft and the winch drum. The required transfer of torque from the shaft to the winch is achieved by a cylindrical elastomeric plug (5) pushed into the winding drum.

There is no requirement for connecting the shaft (6) to the drum mechanically so there is no requirement to manually connect the shaft to the drum therefore the operative's hands are kept well away from the winding drum. The invention is therefore safer than typical prior art tools.

To operate the invention the elastomeric plug is pushed into the drum and then the shaft is turned by a hand crank or a power-driven mechanism (9). The hand crank has two elements: an arm (7) and a handle (8).

The plug is cylindrical so that the outside surface of the plug is in contact with the inside of the winch drum for the full length of the plug.

The external diameter of the plug is manufactured slightly larger than the diameter of the hollow of the winding drum. As the plug is pushed into the cylindrical hole in the winding drum, radial pressure develops between the plug and the winch drum creating rotational resistance.

The external surface of the plug has a saw tooth profile around its perimeter with the apex of the teeth parallel to the longitudinal axis of the plug. The individual teeth are asymmetrical relative to a radial projection from the longitudinal axis of the plug. The front of an individual tooth i.e., in the direction of rotation when the tool is winding the strap, is at a smaller angle relative to a radial projection from the axis of the plug than the back of a tooth which is at a greater angle relative to a radial projection.

As torsion is applied to the plug, friction between the apex of the teeth and the inside of the drum causes the individual teeth to deform such that the teeth tend to be more symmetrical. This effect induces compressive strain in the tooth in the radial direction and consequently increases the rotational frictional resistance of the tooth in contact with the inside of the drum.

The effectiveness of adopting an external diameter of the plug slightly larger than the winch hole diameter combined with the saw tooth configuration of the periphery of the plug was checked physically and found adequate for the function of the tool.

The invention is intended to be used with a conventional strap winch. No modification of a typical winch is required and no alteration of the typical cargo strap winch is required.

Operators or drivers need the loading or unloading of cargo to be as simple, quick and as safe as possible. Because the tool can be simply pushed into the drum and operated, without the requirement of alignment of the shaft, the operator's hands need not be on, or near, the tool.

The present invention allows loading and unloading to be quicker and safer even in poor lighting. The haulage business is typically very competitive and time saved in loading and unloading trucks and trailers can reduce transportation costs significant.

CONCLUSION

The invention claimed is a combination of a conventional load strap winch and an attachable winding tool for the purpose of rewinding load straps on a truck, or trailer, after removing the straps required for securing loads during travel.

The required torsional connection of the tool to the winch is achieved via a cylindrical elastomeric plug pushed into the longitudinal hole in the winch drum.

There are four distinct advantages of the invention relative to the prior art:

1. The three patents described above have machined components. The invention can be one element—not machined. Cost of mass produced, non-machined tool, likely to be less.
2. The tool can be pushed into the winch drum and immediately operated to rewind a strap. There is no second action of making a mechanical connection between the tool and the winch. Time saved and safer.
3. The invention doesn't require aligning so a connection between a winch and a rotary drive apparatus can be easily done in poor lighting.
4. Typically the prior art includes a mechanical connection using hands at the interface between the tool and the drum. The invention tool does not require using hands in this way so is safer.

What is claimed is:

1. A winding tool for winding a strap onto a drum of a cargo winch, the winding tool comprising:
    a shaft having opposite first and second ends and a rotational axis extending therebetween, the first end of the shaft attached to a handle and the second end of the shaft attached to an elastomeric plug,
    the elastomeric plug having a cylindrical body and a rotational axis, the rotational axis of the elastomeric plug being coaxial with the rotational axis of the shaft, the cylindrical body having a saw tooth profile around an external surface of the cylindrical body, with an apex of each tooth of the saw tooth profile being parallel to the rotational axis,
    the cylindrical body having an outer diameter, wherein the outer diameter of the cylindrical body is greater than an inner diameter of a drum hub of the drum of the cargo winch,
    wherein, when the elastomeric plug is inserted into the drum hub of the cargo winch by applying an axial force to the shaft, the elastomeric plug compresses radially inwardly towards the rotational axis of the elastomeric plug to reduce the outer diameter of the cylindrical body.

2. The winding tool of claim 1, wherein the handle comprises an arm extending from the first end of the shaft at a right angle, and a handle portion extending from the arm at a right angle and parallel to the shaft.

3. A winding tool for winding a strap onto a drum of a cargo winch, the winding tool comprising:
    a shaft having opposite first and second ends and a rotational axis extending therebetween, the first end of the shaft attached to a handle and the second end of the shaft attached to an elastomeric plug,
    the elastomeric plug having a cylindrical body and a rotational axis, the rotational axis of the elastomeric plug being coaxial with the rotational axis of the shaft,
    the elastomeric plug further including a plurality of longitudinal notches cut into the cylindrical body, each notch of the plurality of longitudinal notches positioned parallel to the rotational axis of the elastomeric plug,
    the cylindrical body having an outer diameter, wherein the outer diameter of the cylindrical body is greater than an inner diameter of a drum hub of the drum of the cargo winch,
    wherein, when the elastomeric plug is inserted into the drum hub of the cargo winch by applying an axial force to the shaft, the elastomeric plug compresses radially inwardly towards the rotational axis of the elastomeric plug to reduce the outer diameter of the cylindrical body.

4. The winding tool of claim 3, wherein the handle comprises an arm extending from the first end of the shaft at a right angle, and a handle portion extending from the arm at a right angle and parallel to the shaft.

5. A winding tool for winding a strap onto a drum of a cargo winch, the winding tool comprising:
- a shaft having opposite first and second ends and a rotational axis extending therebetween, the first end attached to a handle and the second end attached to an elastomeric plug, the elastomeric plug having a cross-section that is perpendicular to the rotational axis of the shaft, wherein a geometry of the cross-section of the elastomeric plug is stellate and comprises a plurality of circumferential vertices located at a circumference of the elastomeric plug, and
- an outer diameter of the elastomeric plug is uniform from a first end to a second end of the elastomeric plug, the second end opposite the first end of the elastomeric plug, and
- wherein the outer diameter of the elastomeric plug is reduced when the elastomeric plug is compressed upon insertion into a drum hub of the drum of the cargo winch so as to releasably engage an outer surface of the elastomeric plug with an inner surface of the drum hub, wherein a torque applied to the shaft and the elastomeric plug is transmitted to the inner surface of the drum hub so as to rotate the drum hub and the corresponding drum of the cargo winch when the shaft is rotated about the shaft's rotational axis.

6. The winding tool of claim 5, wherein the plurality of circumferential vertices of the stellate geometry of the elastomeric plug's cross-section are each angled towards a first rotational direction of the shaft, and wherein, upon insertion of the elastomeric plug into the drum hub, the plurality of circumferential vertices shift in the first rotational direction during compression of the elastomeric plug; and
- wherein after insertion of the elastomeric plug into the drum hub, the plurality of circumferential vertices shift in a second rotational direction, opposite the first rotational direction of the shaft, as the shaft is rotated in the first rotational direction, to thereby increase a contact surface area between the outer surface of the elastomeric plug and the inner surface of the drum hub.

7. The winding tool of claim 6, wherein the first rotational direction is counter-clockwise and the second rotational direction is clockwise.

8. A method for operating a cargo winch using the winding tool of claim 6, the method comprising:
- attaching the strap to the drum;
- inserting the elastomeric plug of the winding tool into the drum hub of the cargo winch by applying an axial force to the shaft of the winding tool,
- rotating the shaft in the first rotational direction to rotate the drum in the first rotational direction and thereby wind the strap onto the drum.

9. The method of claim 8, further comprising the step of rotating the shaft in the second rotational direction, opposite the first rotational direction, to thereby unwind the strap from the drum.

10. The method of claim 8, wherein the first rotational direction is counter-clockwise and the second rotational direction is clockwise.

11. The winding tool of claim 5, wherein the handle comprises an arm extending at a right angle from the shaft, and a handle portion extending at a right angle from the arm, the handle portion being parallel to the shaft.

* * * * *